(12) United States Patent
Wu

(10) Patent No.: US 8,300,148 B2
(45) Date of Patent: Oct. 30, 2012

(54) VIDEO PROCESSING DEVICE

(75) Inventor: Chun-Te Wu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 537 days.

(21) Appl. No.: 12/605,425

(22) Filed: Oct. 26, 2009

(65) Prior Publication Data

US 2011/0069226 A1    Mar. 24, 2011

(51) Int. Cl.
*H04N 5/46* (2006.01)
*H04N 7/01* (2006.01)

(52) U.S. Cl. ........ 348/555; 348/556; 348/558; 348/554; 348/571; 348/445

(58) Field of Classification Search .................. 348/555, 348/556, 558, 554, 571, 445, 552; 327/100, 327/101, 102
See application file for complete search history.

(56) References Cited

U.S. PATENT DOCUMENTS

2009/0303393 A1* 12/2009 Diao .............................. 348/706

FOREIGN PATENT DOCUMENTS

CN    2810070    8/2006

* cited by examiner

*Primary Examiner* — Jefferey Harold
*Assistant Examiner* — Jean W Desir
(74) *Attorney, Agent, or Firm* — Altis Law Group, Inc.

(57) ABSTRACT

A video processing device includes a processor, a voltage conversion circuit, and a Syndicat des Constructeurs d'Appareils Radiorécepteurs et Téléviseurs (SCART) chip. The processor is operable to process video signals, and control a GPIO (general purpose input output) pin to output different mode controlling signals according to different video signal formats. The voltage conversion circuit connected to the GPIO pin is operable to receive the mode controlling signals, and output different voltage signals according to the different format controlling signals. The SCART chip connected to the voltage conversion circuit is operable to receive the video signals and the voltage signals, and process the video signals according to the corresponding voltage signals.

4 Claims, 2 Drawing Sheets

VIDEO PROCESSING DEVICE

BACKGROUND

1. Technical Field

The present disclosure relates to multimedia technology, and more particularly to a video processing device.

2. Description of Related Art

Video devices often output Syndicat des Constructeurs d'Appareils Radiorécepteurs et Téléviseurs (SCART) signals via a multimedia processor, and can process only one format of video signals. Therefore, the video device often requires either additional SCART matrix integrated circuits (IC), or a plurality of general purpose input output (GPIO) pins to process different video signal formats, such as SCART VCR/TV, for example. The additional components often increase device cost and complexity.

BRIEF DESCRIPTION OF THE DRAWINGS

The details of the disclosure, both as to its structure and operation, can best be understood by referring to the accompanying drawings, in which like reference numbers and designations refer to like elements.

DETAILED DESCRIPTION

Figure 1:
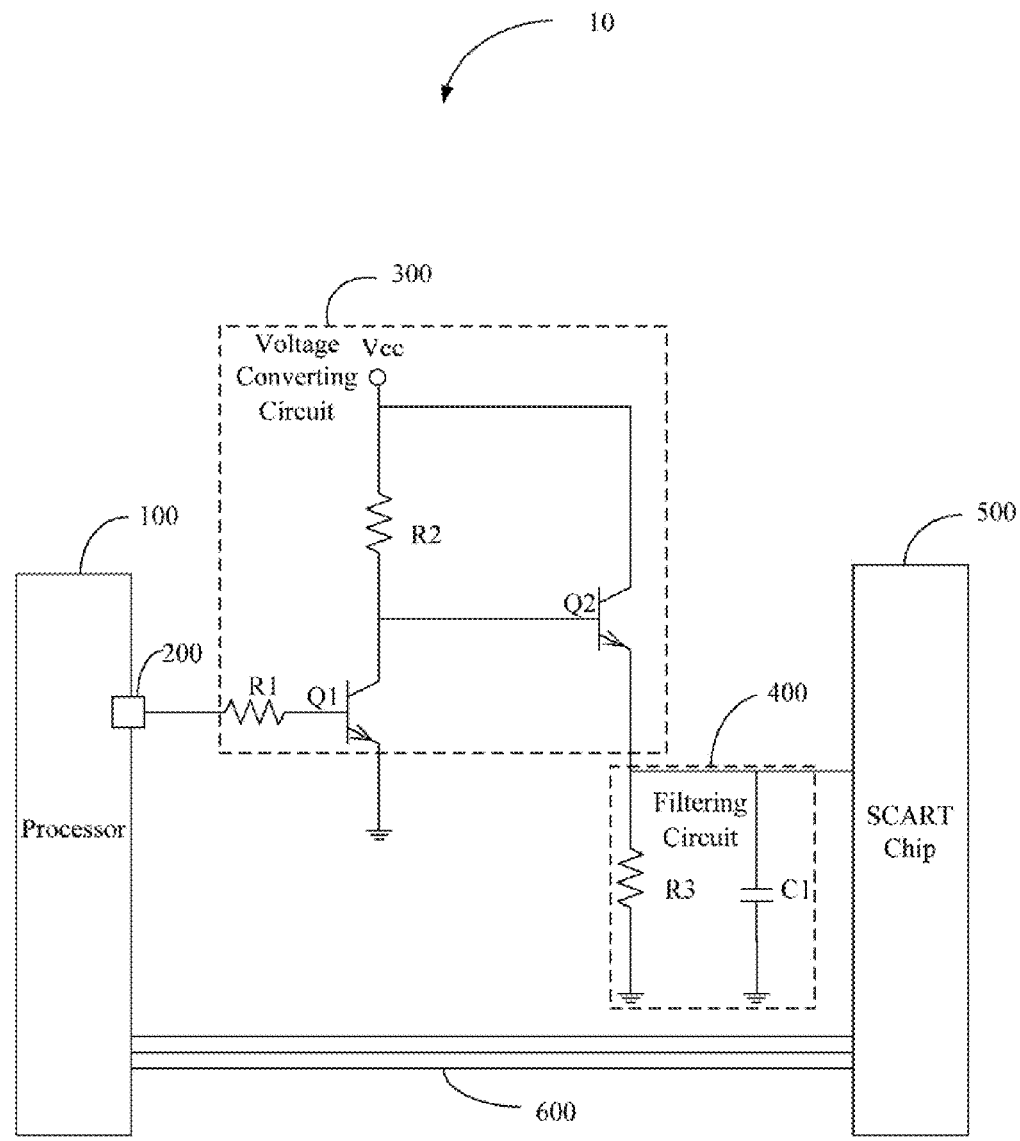
FIG. 1 is a circuit diagram of one embodiment of a video processing device.

FIG. 1 is a circuit diagram of one embodiment of a video processing device 10. In one embodiment, the video processing device 10 includes a processor 100, a voltage conversion circuit 300, and a SCART chip 500.

In one embodiment, the processor 100, comprising a general purpose input output (GPIO) pin 200, is operable to process different video signal formats, and output different mode controlling signals via the GPIO pin 200 according to the different formats of the video signals. In one embodiment, the different video signal formats include a 4:3 video format, and a 16:9 video format. The different mode controlling signals include a high voltage level signal, a low voltage level signal, and a pulse-width modulation (PWM) signal, respectively to direct the SCART chip 500 to assume a standby mode, to output in the 4:3 video format, and to output in the 16:9 video format.

In one embodiment, the mode controlling signals output by the GPIO pin 200 of the processor 100 are the low voltage level signals if the video processing device 10 is in the standby mode. In one embodiment, the low voltage signal is 0V, the high voltage signal is 3.3V, the for example.

In another embodiment, if the video processing device 10 is in the 4:3 video mode, the mode controlling signals output by the GPIO pin 200 are the high voltage level signals.

In a further embodiment, if the video processing device 10 is in the 16:9 video mode the mode controlling signals output by the GPIO pin 200 are the PWM signals.

The voltage conversion circuit 300 is connected to the processor 100 via the GPIO pin 200, and is operable to receive the mode controlling signals and generate and output different voltage signals according to the different mode control signals. The different voltage signals respectively correspond to the different video signal formats. In one embodiment, the voltage conversion circuit 300 outputs a 9.5V-12V voltage signal if the mode controlling signal is the low voltage level signal.

In one embodiment, the voltage conversion circuit 300 outputs a 0V-2V voltage signal if the mode controlling signal is the high voltage level signal.

In one embodiment, the voltage conversion circuit 300 outputs a 4.5V-7V voltage signal if the mode controlling signal is the PWM signal.

In one embodiment, the voltage conversion circuit 300 includes a first current limiting resistor R1, a second current limiting resistor R2, a first transistor Q1, and a second transistor Q2.

The emitter of the first transistor Q1 is grounded, the base of the first transistor Q1 is connected to the GPIO pin 200 through the first current limiting resistor R1, and the collector of the first transistor Q1 is connected to a reference voltage Vcc through the second current limiting resistor R2.

In one embodiment, the base of the second transistor Q2 is connected to the collector of the first transistor Q1, the collector of the second transistor Q2 is connected to the reference voltage Vcc, and the emitter of the second transistor Q2 is connected to the SCART chip 500 to output the different voltage signals to the SCART chip 500.

In one embodiment, the video processing device 10 further comprises a filtering circuit 400. The filtering circuit 400 is connected between the voltage conversion circuit 300 and the SCART chip 500, and operable to filter noise from the different voltage signals.

In one embodiment, the filtering circuit 400 comprises a third resistor R3 and a capacitor C1. In one embodiment, the third resistor R3 and the capacitor C1 are connected in parallel between the emitter of the second transistor Q2 and the ground.

In one embodiment, the value of the first current limiting resistor R1 is about 1 kΩ. The value of the second current limiting resistor R2 is about 30 KΩ. The value of the reference voltage Vcc is about 12V. The models of the first transistor Q1 and the second transistor Q2 are both Q2N3904. The value of the third resistor R3 is about 4.7 kΩ, and the value of the capacitor C1 is about 2.2 uF. In other embodiments, the voltage conversion circuit 300 can employ amplifiers or MOSFETs to control the SCART chip 500 to process different video signals.

The SCART chip 500, connected to the voltage conversion circuit 300 and the processor 100, is operable to receive the different video signals from the processor 100 and the different voltage signals from the filtering circuit 400, and process the different video signals according to the corresponding voltage signals. In one embodiment, the processor 100 is connected to the SCART chip 500 through a bus 600, through which the processor 100 can provide the different video signal formats to the SCART chip 500.

In one embodiment, the SCART chip 500 is in the standby mode and does not process the video signals when the voltage conversion circuit 300 outputs the 0V-2V voltage signal.

In another embodiment, the SCART chip 500 processes the video signals according to the 4:3 video format when the voltage conversion circuit 300 outputs the 4.5V-7V voltage signal.

In a further embodiment, the SCART chip 500 processes the video signal according to the 16:9 video format when the voltage conversion circuit 300 outputs the 9.5V-12V voltage signal.

Figure 2:
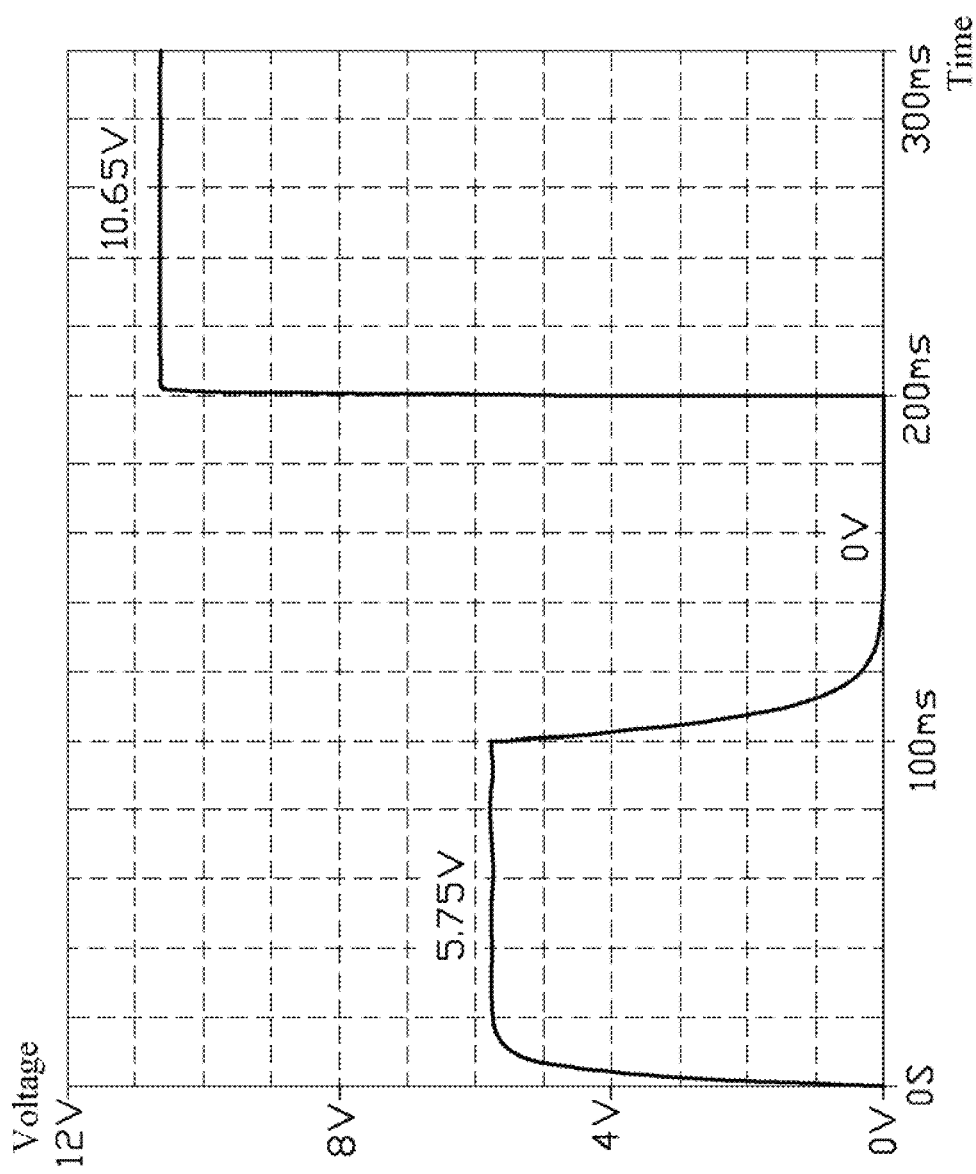
FIG. 2 is a graph showing one example of a circuit simulation result of the video processing device of FIG. 1.

Referring to FIG. 2, a graph showing one example of a circuit simulation result of the video processing device 10 of FIG. 1 is shown.

At time 0-100 ms, the processor 100 processes a 16:9 video format signal. The GPIO pin 200 outputs a PWM mode control signal. Accordingly, the voltage conversion circuit 300 outputs a 5.75V voltage signal, and the SCART chip 500 processes the video signal according to the 16:9 video format.

At time 100 ms-200 ms, the processor 100 processes the 4:3 format video signal. The GPIO pin 200 outputs a low voltage level mode control signal. Accordingly the voltage conversion circuit 300 outputs 0V of the voltage signal, and the SCART chip 500 processes the video signal according to the 4:3 video format.

At time 200 ms-300 ms, the processor 100 processes no video signal, and the GPIO pin 200 outputs a high voltage level mode control signal. Accordingly, the voltage conversion circuit 300 outputs 10.65V of the voltage signal, and the SCART chip 500 does not processes the video signal.

In the present disclosure, the video processing device 10 controls the processor 100 outputs different mode controlling signals via the GPIO pin 200, and the voltage conversion circuit 300 outputs different voltage signals according to the different mode controlling signals to direct the SCART chip 500 to process the different video signal formats. Therefore, the SCART chip 500 can process different video signal formats without requiring additional SCART matrix integrated circuits (IC) or more than one GPIO pins, and thus the cost of the video processing device 10 is conserved.

Although the features and elements of the present disclosure are described in various inventive embodiment in particular combinations, each feature or element can be configured alone or in various within the principles of the present disclosure to the full extent indicated by the broad general meaning of the terms in which the appended claims are expressed.

What is claimed is:

1. A video processing device, comprising:
    a processor comprising a general purpose input output (GPIO) pin, wherein the processor is operable to process different video signals, and to output different mode controlling signals via the GPIO pin according to different video signal formats;
    a voltage conversion circuit connected to the GPIO pin to receive the mode controlling signals, and generate and output different voltage signals according to the different mode controlling signals, wherein the different voltage signals respectively correspond to the different video signal formats; and
    a Syndicat des Constructeurs d'Appareils Radiorécepteurs et Téléviseurs (SCART) chip connected to the voltage conversion circuit and the processor, to receive the different video signals from the processor and the different voltage signals from the voltage conversion circuit, and process the different video signals according to the corresponding voltage signals;
    wherein the voltage conversion circuit comprises: a first transistor, an emitter of the first transistor being grounded, a base of the first transistor being connected to the GPIO pin through a first current limiting resistor, and a collector of the first transistor being connected to a reference voltage through a second current limiting resistor; and a second transistor, a base of the second transistor being connected to the collector of the first transistor, a collector of the second transistor being connected to the reference voltage, and an emitter of the second transistor being connected to the SCART chip to output the different voltage signals to the SCART chip.

2. The video processing device as claimed in claim 1, further comprising a filtering circuit connected between the voltage conversion circuit and the SCART chip, to filter noise from the different voltage signals.

3. The video processing device as claimed in claim 1, wherein the different formats of the video signals comprise a 4:3 video format and a 16:9 video format.

4. The video processing device as claimed in claim 3, wherein the different mode controlling signals comprise a high voltage level signal, a low voltage level signal, and a pulse-width modulation (PWM) signal, to respectively direct the SCART chip to assume a standby mode, to output in the 4:3 video format, and to output in the 16:9 video format.

* * * * *